United States Patent Office 3,219,730
Patented Nov. 23, 1965

3,219,730
METHOD OF MAKING FUEL CELL ELEMENTS
Jerald L. Bliton, Matteson, and Harold L. Rechter and James S. Griffith, Chicago, Ill., assignors to Institute of Gas Technology, a corporation of Illinois
No Drawing. Filed June 27, 1961, Ser. No. 119,792
6 Claims. (Cl. 264—.5)

This invention relates to a method of making fuel cell elements and more particularly to the making of solid electrolyte elements for fuel cells and similar purposes.

As used herein the term element is taken to mean a film or membrane of an oxygen ion conducting material usable as an electrolyte, or a composite element including such an oxide film with porous metal electron-conducting coatings bonded to each side of the oxide film.

More specifically, the present invention relates to a method of making solid electrolyte elements of the type specifically disclosed and claimed in the co-pending application of Karl S. Vorres, Serial No. 67,479 filed November 7, 1960, now abandoned. Such elements consist of a mixture or solid solution of a host oxide taken from the group consisting of $ZrO_2$, $HfO_2$, $ThO_2$ and $UO_2$ with a mixing oxide taken from the group consisting of CaO and MgO. To perform efficiently, the electrolyte must be sufficiently dense so as not to allow the transmission of gas therethrough but must be capable of permitting the transmission of oxygen ions and must be non-conductor of electrons at fuel cell operating temperatures below about 1000° C.

According to the present invention, the oxide is formed as a sintered film on a base or substrate from which it can be removed without damage to it. Preferably, the base or substrate is formed of a material capable of being removed by chemical action, such as dissolving the material away from the film, or of a combustible material which can be burned away from the film.

According to a feature of the invention, the oxide film is formed by flame spraying powdered oxide material onto the base or substrate. The film may be made of any desired thickness and may be brought to the desired density by heating it while pressing it between flat surfaces after removal from the base, or by impregnation with suitable impregnants, followed by heating.

According to another feature of the invention, a conductive coating of sintered metal may be formed over one or both surfaces of the oxide film by flame spraying metal powder thereon. Nickel is the preferred metal because of its good resistance to corrosion, its relatively low cost and its good performance under current drain. However, other metals such as platinum, palladium, silver and copper can be used as flame-sprayed electrodes.

In carrying out the method of the invention, the base or substrate is first formed of a material which can easily be removed from the subsequently formed film. The base may be a smooth metal plate to which a layer of ceramic, such as $ZrO_2$ is applied. Preferably, however, the base is formed of a material removable by chemical action from the film. One satisfactory material according to the invention is a water soluble salt, such as sodium chloride, calcium chloride or sodium silicate. Alternatively, the base may be formed of graphite which can be burned away without damage to the thin film.

The surface of the base or substrate is then covered with a film of sintered oxide by flame spraying. The oxide film may be built up to any desired thickness, on the order of about 10 mils, or preferably less. Thereafter the film is removed from the base by stripping it therefrom, by dissolving the base or substrate in water or by burning away the base or substrate.

The removed film is then preferably treated to bring it to the desired density and to remove residual stresses remaining therein by placing it between opposed smooth surfaces, such as plates of ziroconium oxide, and heating it to an elevated temperature, typically 1500° C. The exact temperature and time of heating will vary with the precise oxide employed, the film thickness and the desired density of the finished product. It is also possible to densify flame-sprayed oxide films by impregnation with a decomposable zirconium salt, followed by firing.

To make composite anode electrolyte-cathode elements, the densified oxide film freed from its base may be metallized on both sides by flame spraying, and then heated to about 800° C. to remove strains. Alternatively, for making composite elements the oxide film may be flame-sprayed with a porous coating of metal before removal from the base. After removal from the base and before heating to about 800° C. to remove strains, the side of the film which was adjacent to the base may also be sprayed to provide a conductive metal coating on both sides of the oxide electrolyte film. The temperature of heating is, of course, limited by the melting points of the metallized electrodes.

Another procedure which contributes to uniformity of the film and simplifies densification is to impregnate the film with a solution of a decomposable salt of a metal from which the host oxide is formed, drying the solution, and heating it above its decomposition temperature to convert it to an oxide. Nitrates of the metals from which the host oxides are formed are satisfactory for this purpose since they are water soluble and decompose at about 400° C. Preferably the film is impregnated and dried a plurality of times, before being heated to fill the interstices therein as uniformly as possible. After heating to decomposition temperature in the presence of oxygen, either released from the salt or taken from the surrounding atmosphere, the film is heated to about 1500° C. to densify it. In this case, however, the high densifying temperature need not be maintained for as long a time as if the oxide film is not impregnated.

Example I

A thin sodium chloride layer was applied to a two inch diameter steel disc by preheating the disc to 800° F., then spraying the surface with a saturated aqueous of NaCl, using a commercial liquid spray gun. This salt layer was then overcoated by the flame-spray process using an oxyhydrogen torch in the oxygen stream of which lime-stabilized zirconia (15 mol % CaO–85 mol % $ZrO_2$) powder with the approximate particle range of 1 to 20 microns was sprayed at a nozzle substrate distance of 2½ inches, and $H_2$-$O_2$ gas flows of 135 cu. ft./hr. and 55 cu. ft./hr. respectively, both at 25 p.s.i. gage pressure.

After a zirconia coating a thickness approximately 10 mils had been obtained, the composite was allowed to cool, and then placed in a pan of water which dissolved the salt layer, releasing the zirconia film.

The zirconia film was then placed between two flat lime-stabilized zirconia plates and fired in a gas kiln to 1500° C. for one hour. The resulting piece was flat, dense, and sufficiently transparent to permit the reading of pinted matter through it. No flame-sprayed electrodes were applied.

The film so obtained was placed in a fuel cell with conventional plate electrodes of porous sintered metal, and functioned successfully to produce electrical current.

Example II

A sodium chloride coating and a zirconia coating were formed as described in Example I. Before the zirconia was released from the salt, a porous nickel coating was applied to the zirconia by flame spraying using nickel powder and equipment settings specified in Example I but with a spray distance of approximately six inches.

The salt layer was dissolved away with water and the nickel-zirconia composite fired between two flat ceramic plates to 800° C. This firing to the temperature normally used in the fuel cell operation was used to reduce the change of residual stresses damaging the fuel cell.

This composite element when tested in a fuel cell was found to produce sufficient electrical current to demonstrate its complete feasibility.

*Example III*

A sodium chloride layer and stabilized zirconia film were applied as in Example I. The freed oxide film was then immersed in a saturated solution of zirconyl nitrate and dried to 400° C. to decompose the nitrate and leave a zirconia residue in the pores. The process of immersion and drying was repeated three times. Then the impregnated oxide film was fired to 1500° C. in the manner of Example I. The film was then impermeable to air at 22° C. and 4.8 cm. Hg gage pressure.

It should be noted that any of the specific host oxides may be mixed with any of the mixing oxides in the proportion of approximately 85% host oxide and 15% mixing oxide in accordance with the invention. Also, the film after being formed may be removed from the base or substrate in any of the several different manners set forth above with equally good results as to final product. It is therefore not intended that the invention be limited to the specific examples given herein or otherwise than by the terms of the appended claims.

What is claimed is:

1. The method of making a fuel cell element which comprises forming a base capable of removal by chemical action, forming on the base a sintered film of a mixed oxide composed of a host oxide taken from the group consisting of $ZrO_2$, $HfO_2$, $ThO_2$ and $UO_2$, and a mixing oxide taken from the group consisting of CaO and MgO, forming over the film a coating of sintered metal defining a conductive metal electrode, and removing the base from the film and coating without affecting the film or coating, and heating the film and coating to an elevated temperature below the melting point of the coating to remove strains.

2. The method of making a fuel cell element which comprises forming a base capable of removal by chemical action, forming on the base a sintered film of a mixed oxide composed of a host oxide taken from the group consisting of $ZrO_2$, $HfO_2$, $ThO_2$ and $UO_2$, and a mixing oxide taken from the group consisting of CaO and MgO, forming over the film a coating of sintered metal defining a conductive metal electrode, removing the base from the film and coating without affecting the film or coating and forming a second coating of sintered metal over the surface of the film exposed by removal of the base defining a second conductive metal electrode and heating the film and coating to an elevated temperature below the melting point of the coating to remove strains.

3. The method of making a fuel cell element which comprises flame spraying onto a base a mixture of $ZrO_2$ and CaO to form a film, flame spraying over the film a coating of metal powder defining a porous conductive metal electrode, and removing the base from the film and heating the film and coating to an elevated temperature below the melting point of the coating to remove strains.

4. The method of making a fuel cell element which comprises flame spraying onto a base a mixture of $ZrO_2$ and CaO to form a film, flame spraying over the film a coating of metal powder defining a porous conductive metal electrode, removing the base from the film and flame spraying a coating of metal powder on the side of the film exposed by removal of the base defining a second porous metal conductive metal electrode and heating the film and coating to an elevated temperature below the melting point of the coating to remove strains.

5. The method of making a fuel cell element which comprises forming a porous sintered film of a mixed oxide composed of a host oxide taken from the group consisting of $ZrO_2$, $HfO_2$, $ThO_2$ and $UO_2$, and a mixing oxide taken from the group consisting of CaO and MgO, impregnating the film with a solution of a decomposable salt of a metal taken from the group consisting of Zr, Hf, Th and U, drying the solution in place, and heating the impregnated film above the decomposition temperature of the salt to convert the salt into an oxide of the metal and forming over the film a coating of sintered metal defining a conductive metal electrode.

6. The method of making a fuel cell element which comprises forming a porous sintered film of a mixed oxide composed of a host oxide taken from the group consisting of $ZrO_2$, $HfO_2$, $ThO_2$ and $UO_2$, and a mixing oxide taken from the group consisting of CaO and MgO, impregnating the film with a solution of a decomposable salt of a metal taken from the group consisting of Zr, Hf, Th and U, drying the solution in place, and heating the impregnated film above the decomposition temperature of the salt to convert the salt into an oxide of the metal, and subjecting the film to a temperature of about 1500° C. to densify it.

References Cited by the Examiner

UNITED STATES PATENTS

| | | | |
|---|---|---|---|
| 616,276 | 12/1898 | Thowless | 117—221 |
| 1,475,764 | 11/1923 | Frederick. | |
| 1,823,984 | 9/1931 | Nicolson | 117—221 |
| 1,915,186 | 6/1933 | Hale | 117—221 |
| 2,290,913 | 7/1942 | Lopp et al. | 117—221 |
| 2,360,479 | 10/1944 | Detrich et al. | |
| 2,766,032 | 10/1956 | Meister | 25—156 |
| 2,974,388 | 3/1961 | Ault. | |

CARL D. QUARFORTH, *Primary Examiner.*

REUBEN EPSTEIN, ALEXANDER H. BRODMERKEL, ROBERT F. WHITE, *Examiners.*